United States Patent
Karabassi et al.

(10) Patent No.: US 7,564,571 B2
(45) Date of Patent: Jul. 21, 2009

(54) METHOD FOR CALIBRATING A CAMERA-LASER-UNIT IN RESPECT TO A CALIBRATION-OBJECT

(75) Inventors: Evaggelia-Aggeliki Karabassi, Penteli (GR); Nikolaos Karanastasis, Chalandri (GR); Konstantinos Voliotis, Penteli (GR)

(73) Assignee: inos Automationssoftware GmbH, Stuttgart (DE)

( * ) Notice: Subject to any disclaimer, the term of this patent is extended or adjusted under 35 U.S.C. 154(b) by 464 days.

(21) Appl. No.: 10/550,107

(22) PCT Filed: Sep. 4, 2004

(86) PCT No.: PCT/EP2004/009892

§ 371 (c)(1),
(2), (4) Date: Sep. 21, 2005

(87) PCT Pub. No.: WO2005/043076

PCT Pub. Date: May 12, 2005

(65) Prior Publication Data

US 2006/0268285 A1     Nov. 30, 2006

(30) Foreign Application Priority Data

Oct. 17, 2003    (EP)    ................................. 03023402

(51) Int. Cl.
G01B 11/24 (2006.01)
G06K 9/46 (2006.01)
(52) U.S. Cl. .................. 356/623; 356/625; 356/601; 382/203; 382/154; 345/427
(58) Field of Classification Search ......... 356/601–625, 356/3.01, 3.1; 382/154, 100, 276, 285; 345/419, 345/427; 700/259, 245, 247, 251–252; 702/94–95, 702/150, 152, 245
See application file for complete search history.

(56) References Cited

U.S. PATENT DOCUMENTS 4,645,348 A    2/1987    Dewar
4,942,539 A *  7/1990    McGee et al. ............... 700/253

(Continued)

FOREIGN PATENT DOCUMENTS

WO    WO 01/69172    9/2001
WO    WO 02/16865    2/2002

OTHER PUBLICATIONS

Michael Tapper and Phillip J. McKerrow and Jo Abrantes: "Problems Encountered in the Implementation of Tsai's Algorithm for Camera Calibration". Proceedings 2002 Australasian Conference on Robotics and Automation, Auckland, Nov. 27-29, 2002, pp. 66-70.
Seong-Woo Park et al.: "Practical ways to calculate camera lens distortion for real-time camera calibration". Pattern Recognition, Jun. 2001 Elsevier, UK, vol. 34, No. 6, pp. 1199-1206.

*Primary Examiner*—Sang Nguyen
(74) *Attorney, Agent, or Firm*—Paul Vincent (57) ABSTRACT

The invention refers to a method for calibrating a camera-laser-unit (1) with respect to at least one calibration-object (12) disposed at a given position and orientation in a three-dimensional space (13). The camera-laser-unit (1) comprises a laser (4) and a camera (3), wherein the laser (4) and the camera (3) are disposed at a given distance with respect to each other. An optical axis (9) of the laser (4) and an optical axis (8) of the camera (3) subtend a given angle (α). The camera-laser-unit (1) is adapted to record the location, form and/or dimensions of a measurement-object (5). The method has the advantage that the same calibration-object (12) can be used for the calibration of the camera (3) and of the laser (4), wherein the camera (3) is first calibrated using a Tsai-algorithm and then the laser (4) is calibrated with respect to, and by making use of, the already calibrated camera (3).

12 Claims, 5 Drawing Sheets

U.S. PATENT DOCUMENTS

| | | | |
|---|---|---|---|
| 5,475,584 A * | 12/1995 | Bani-Hashemi | 700/62 |
| 5,748,865 A * | 5/1998 | Yamamoto et al. | 345/423 |
| 6,081,273 A * | 6/2000 | Weng et al. | 345/420 |
| 6,101,455 A * | 8/2000 | Davis | 702/94 |
| 6,166,811 A | 12/2000 | Long | |
| 6,321,137 B1 * | 11/2001 | De Smet | 700/245 |
| 6,415,051 B1 * | 7/2002 | Callari et al. | 382/154 |
| 6,510,244 B2 * | 1/2003 | Proesmans et al. | 382/203 |
| 6,728,417 B1 * | 4/2004 | Hara et al. | 382/275 |
| 6,816,755 B2 * | 11/2004 | Habibi et al. | 700/259 |
| 6,917,702 B2 * | 7/2005 | Beardsley | 382/154 |
| 2002/0158873 A1 * | 10/2002 | Williamson | 345/427 |

\* cited by examiner

METHOD FOR CALIBRATING A CAMERA-LASER-UNIT IN RESPECT TO A CALIBRATION-OBJECT

This application is the national stage of PCT/EP2004/09892 filed on Sep. 4, 2004 and also claims Paris Convention priority of EP 03023402.5 filed on Oct. 17, 2003

BACKGROUND OF THE INVENTION

The present invention refers to a method for calibrating a camera-laser-unit with respect to at least one calibration-object disposed at a given position and orientation in a three-dimensional space. The camera-laser-unit comprises at least one laser (light-amplification by stimulated emission of radiation) and at least one camera. The laser and the camera are disposed in a given distance with respect to one another. An optical axis of the laser and an optical axis of the camera subtend a given angle. The camera-laser-unit is adapted to record the location, form and/or dimensions of a measurement-object.

The invention also concerns a calibration-object used for calibrating a camera-laser-unit and disposed at a given position and orientation within a three-dimensional space. The camera-laser-unit comprises at least one laser and at least one camera. The laser and the camera are disposed at a given distance and an optical axis of the laser and an optical axis of the camera subtend a given angle. The camera-laser-unit is adapted to record the location, form and/or dimensions of a measurement-object.

Camera-laser-units of the kind mentioned above are well known in the art. For example, such a camera-laser-unit is produced and sold by Perceptron, Inc., 47827 Halyard Drive, Plymouth, Mich. 48170, USA. Furthermore, such a camera-laser-unit and the use of such a unit is described in detail in the U.S. Pat. Nos. 4,645,348 and 6,166,811 both issued to Perceptron, Inc. A preferred embodiment of a camera-laser-unit of the kind mentioned above is described in detail in the German patent application 103 11 247, filed on Mar. 14, 2003 by the applicant of the present patent application. The publications of the two US-patents and of the German patent application are hereby incorporated by reference.

According to the methods known in the art, calibration of a camera-laser-unit is very complex and time-consuming. To begin with, a first calibration-object has to be disposed with respect to the camera-laser-unit and the camera is calibrated with respect to the first calibration-object by, for example, making use of a Tsai algorithm, which is well known in the art. Thereafter, a second calibration-object has to be disposed with respect to the camera-laser-unit and the laser is also calibrated with respect to the second calibration-object.

The second conventional calibration-object typically comprises a planar object with an array of pins protruding from the plane. The pins represent a non-coplanar calibration-pattern used for calibrating the laser. The dimensions and distances of the pins are known. The problem is that the pins, when illuminated by the laser or any other light source, form shadows on the adjacent pins, the shadows rendering very complicated and even impossible an accurate calibration of the laser.

Therefore, it is known to make the pins retractable and to extract them one by one from the planes of the cubic second calibration-object. After the extraction of each pin, a calibration routine is run and then the next pin is extracted with another calibration routine run thereafter, and so on. Thus, the calibration of the laser consists of numerous calibration routines. It may be well understood that in this way calibration of the laser is very cumbersome and requires a relatively long time. Typically, the calibration of the laser with the described method will take a couple of hours. Furthermore, the known calibration-method may be used only in laboratories or other places where the calibration assembly required for the calibration process may be built up. It is certainly not suited for calibration of lasers during the intended use of the camera-laser-unit.

One way for simplifying the calibration of the laser could be to reduce the number of pins. However, reducing the number of pins would reduce accuracy of the calibration.

It is an object of the present invention to simplify the process of calibration of a camera-laser-unit without reducing the associated accuracy.

SUMMARY OF THE INVENTION

This object is achieved by a method for calibrating a camera-laser-unit comprising the features of the independent method claim. In particular, a method of the above mentioned kind is suggested comprising the steps of:

selecting a calibration-object having at least two planes disposed in a given angle with respect to each other and provided with a given non-coplanar calibration-pattern;

disposing the calibration-object with respect to the camera-laser-unit at a given position and orientation in the three-dimensional space, wherein the orientation of the calibration-object is such that light emitted by the laser is visible on at least two planes of the calibration-object;

calibrating the camera with respect to the calibration-object using a Tsai algorithm;

activating the laser to emit light visible on the at least two planes of the calibration-object;

recording the light on the planes by the camera;

determining the laser-properties from the light recorded by the camera; and calibrating the laser according to the determined laser-properties.

It is a main aspect of the present invention that the same calibration-object is used for the calibration of the camera as well as for the calibration of the laser. Furthermore, after calibration of the camera with respect to the calibration-object, the laser is calibrated with respect to the (already calibrated) camera. In other words, the camera is used for calibrating the laser.

The whole procedure for calibrating a camera-laser-unit takes very little time and can be accomplished within a few seconds. This makes it the ideal procedure for calibration of a camera-laser-unit during its intended field use. For example, the application of the camera-laser-unit (recording the location, form and/or dimensions of a measurement-object) could be interrupted for a short period, an industrial robot carrying the camera-laser-unit could move the unit to the calibration-object and dispose it in front of the object. Then the calibration process according to the present invention is run. Thereafter, the robot would move the camera-laser-unit away from the calibration-object back to the measurement-object and the intended use of the unit would be resumed.

According to a preferred embodiment of the invention it is suggested that calibrating the laser comprises the step of defining a relative position and orientation of the laser with respect to a coordinate frame associated with the calibration-object, wherein the coordinate frame associated with the calibration-object is in a given position and orientation in the three-dimensional space.

Concerning the calibration of the laser, it is suggested that
the light emitted by the laser is visible on the planes of the
calibration-object as a line on each plane, the lines intersecting on a contact line of the two planes; and
the laser-properties are determined from the lines recorded by the camera by means of a line detection algorithm.

Visible in the sense of the present invention means that the light emitted by the laser is visible to the camera. So this definition would comprise, for example, a case where the laser emits infrared (IR) light, invisible to the human eye but visible to an IR camera.

In other words, three points can be defined for the calibration of the laser, the two end points of the lines on the two planes of the calibration-object and the point of intersection of the two lines.

Further, it is suggested that
the light emitted by the laser is visible on the planes of the calibration-object as a line on each plane, the lines intersecting on a contact line of the two planes;
a laser-plane is defined by the optical axis of the laser and the lines visible on the planes of the calibration-object; and
in order to calibrate the laser according to the determined laser-properties, the position and orientation of the laser-planes with respect to a coordinate frame associated with the calibration-object is defined.

Concerning the calibration of the camera it is suggested that the method comprises the step of defining a relative position and orientation of the camera with respect to a coordinate frame associated with the calibration-object, wherein the coordinate frame associated with the calibration-object is at a given position and orientation in three-dimensional space.

According to another embodiment of the present invention, a transformation matrix is defined in dependence on the relative position and orientation of the camera with respect to a coordinate frame associated with the calibration-object, the relative position and orientation of the laser with respect to a coordinate frame associated with the calibration-object, and optionally on internal camera parameters. The picture taken from the measurement-object by the camera is superposed or multiplied with the transformation matrix in order to obtain the actual location, form and/or dimensions of the measurement-object.

According to yet another embodiment of the present invention, the camera-laser-unit to be calibrated is grasped by an industrial robot and disposed at a given position and orientation in the three-dimensional space with respect to the calibration-object, wherein the orientation of the camera-laser-unit is such that light emitted by the laser is visible on at least two planes of the calibration-object.

The object of the present invention is also achieved by a calibration-object of the above-mentioned kind characterized in that it comprises two planes disposed at a given angle to each other, provided with a non-coplanar calibration-pattern on each plane comprising an array of features, and the calibration-object is used for calibration of the camera as well as for calibration of the laser. The array of features represents a grid of calibration points used for calibrating the camera as well as the laser of the camera-laser-unit.

According to a preferred embodiment of the present invention, the angle between the two planes is a right angle. The light emitted by the laser is visible on the planes of the calibration-object as a line on each plane, the lines intersecting on a contact line of the two planes. In this way, the maximum possible volume in space can be calibrated.

The features of the calibration-object may have recesses, in particular cavities with a circular cross section, or prints on the planes of the calibration-object. The features may have any shape or design. For example, the features may have rectangular recesses or prints with a square or a circular cross section, as viewed from above. The prints on the planes have a different color or a different surface than the planes of the calibration-object, so that the features and the calibration pattern can be detected by the camera during the calibration process.

Further embodiments as well as further advantages of the present invention are outlined in the following description of the enclosed figures.

DESCRIPTION OF THE PREFERRED EMBODIMENT

Figure 2:
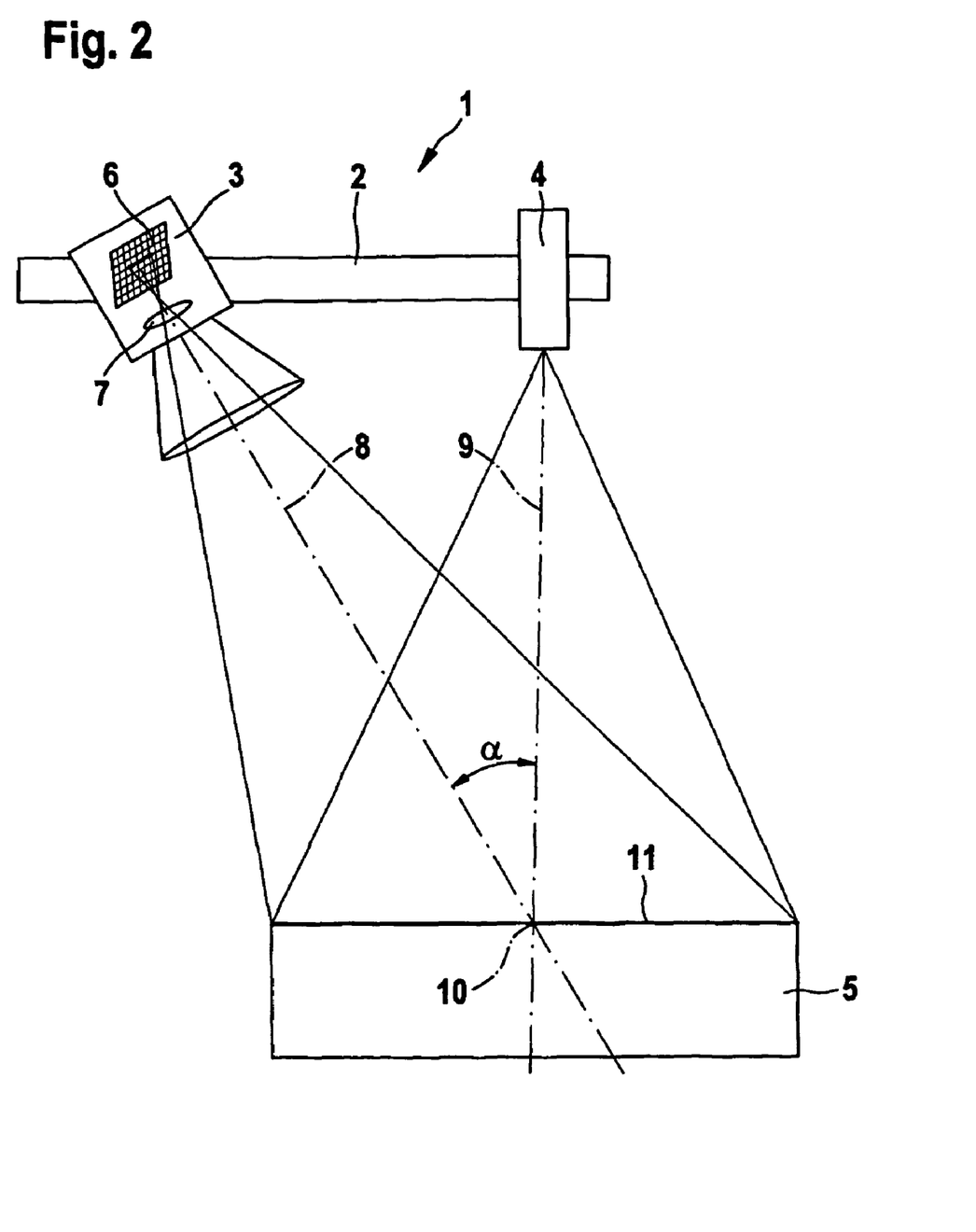
FIG. 2 shows a schematic view of a preferred embodiment of an assembly for recording the location, form and/or dimensions of a measurement-object by means of the calibrated camera-laser-unit.

The present invention refers to a camera-laser-unit for recording the location, form and/or dimensions of a measurement-object. The camera-laser-unit shown in FIG. 2 as a whole is designated with reference sign 1. It comprises mounting means 2 with a camera 3 and a light source 4, in particular a laser, mounted thereon. The laser 4 illuminates part of the measurement-object 5 and the camera 3 takes an image of the illuminated measurement-object 5. The camera 3 comprises a CCD (charged coupled device)-chip 6 or other means (e.g. a CMOS-chip) for converting optical signals of the image into electrical signals for further processing within the camera-laser-unit 1. Furthermore, the camera 3 comprises an optical system 7, in particular a lens, for reproducing the image on the CCD-chip 6. The camera 3 and the laser 4 are disposed on the mounting means 2 such that an optical axis 8 of the camera 3 intersects an optical axis 9 of the laser 4 at a measurement point 10. The measurement point 10 is not necessarily disposed on a contact line between the two planes 14, 15. Preferably the optical axis 8 and 9 are disposed in an angle α of 45° with respect to one another. The laser 4 generates a line 11 on the measurement object 5, which is recorded by the camera 3 and reproduced on the CCD-chip 6 by the lens 7.

For example, a camera-laser-unit of the mentioned kind is produced and sold by Perceptron, Inc., 47827 Halyard Drive, Plymouth, Mich. 48170, USA. Furthermore, such a camera-laser-unit and the use of such a unit is described in detail in the U.S. Pat. Nos. 4,645,348 and 6,166,811 both issued to Perceptron, Inc. A preferred embodiment of a camera-laser-unit of the kind mentioned above is described in detail in the German patent application 103 11 247, filed on Mar. 14, 2003 by the applicant of the present patent application. The publications of the two US-patents and of the German patent application are hereby incorporated by reference into the present specification, in particular for more detailed information on possible structures of camera-laser-units and on the process of determining the location, form and/or dimensions of a measurement-object by means of a camera-laser-unit.

Figure 1:
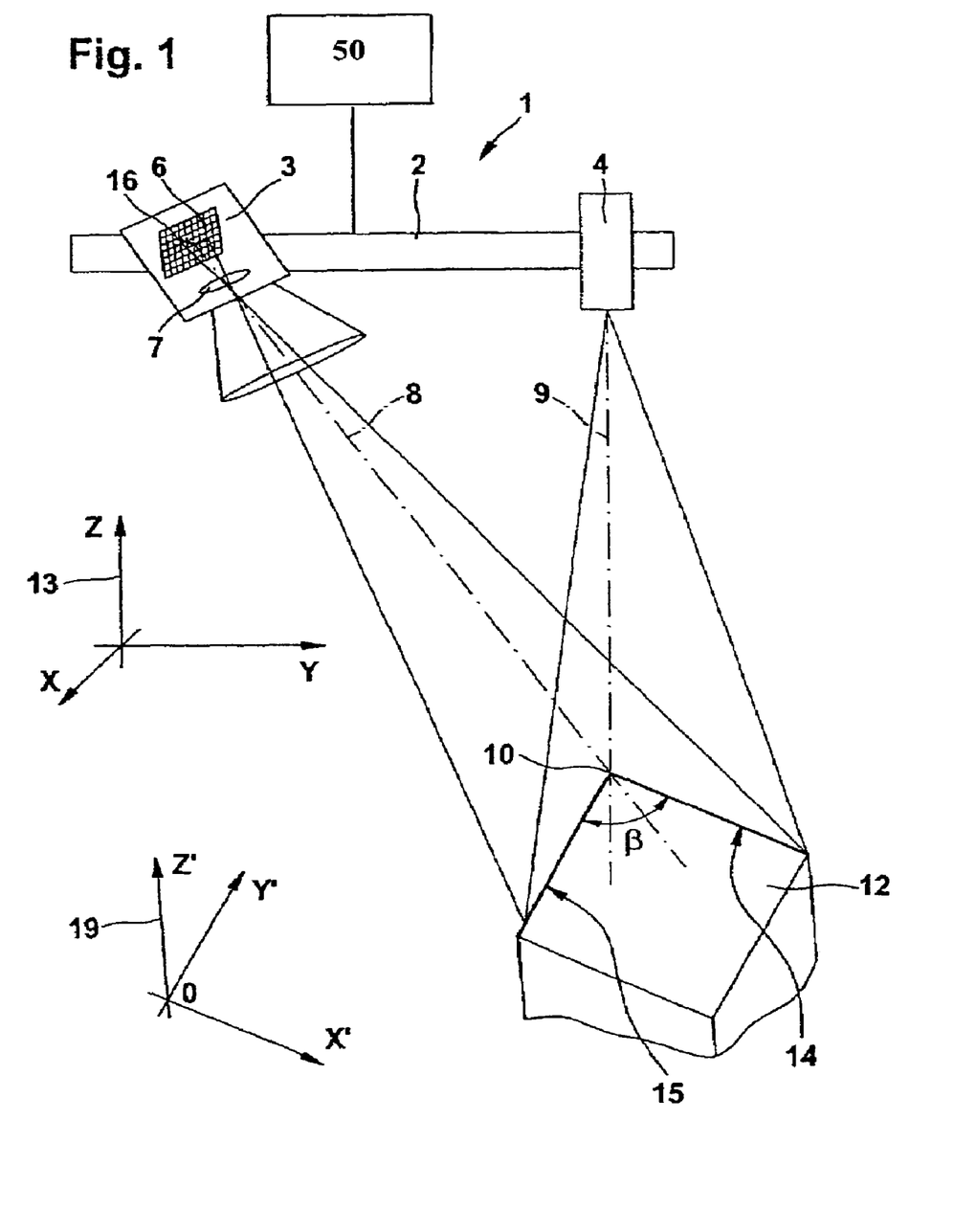
FIG. 1 shows a schematic view of a preferred embodiment of a calibration setup for calibrating a camera-laser-unit according to the present invention.

However, before the camera-laser-unit 1 can be used for recording the location, form and/or dimensions of a measurement-object 5, it has to be calibrated. During the calibration process the camera 3 and the laser 4 are put into relationship with the coordinates of a calibration-object 12 (see FIG. 1) and a three-dimensional space 13, with the calibration-object 12 being disposed at a given position and orientation within the three-dimensional space 13. In particular, camera parameters are determined and a relative position of one or more laser planes is defined with respect to a coordinate frame 19 related to the calibration-object 12. A laser plane is defined by the optical axis 9 and the line 11 of light emitted by the laser 4 (see FIG. 2 or 3). Calibration of the camera-laser-unit 1 is necessary in order to allow the camera-laser-unit 1 to determine absolute values for the location, form and/or dimensions of the measurement-object 5. FIG. 1 also shows that the camera-laser-unit 1 to be calibrated can be grasped by an industrial robot 50 and disposed relative to the calibration-object 12 in a given position and orientation in three-dimensional space 13. The orientation of the camera-laser-unit 1 is such that light 11 emitted by the laser 4 is visible for the camera 3 on at least two planes 14, 15 of the calibration-object 12.

Figure 3:
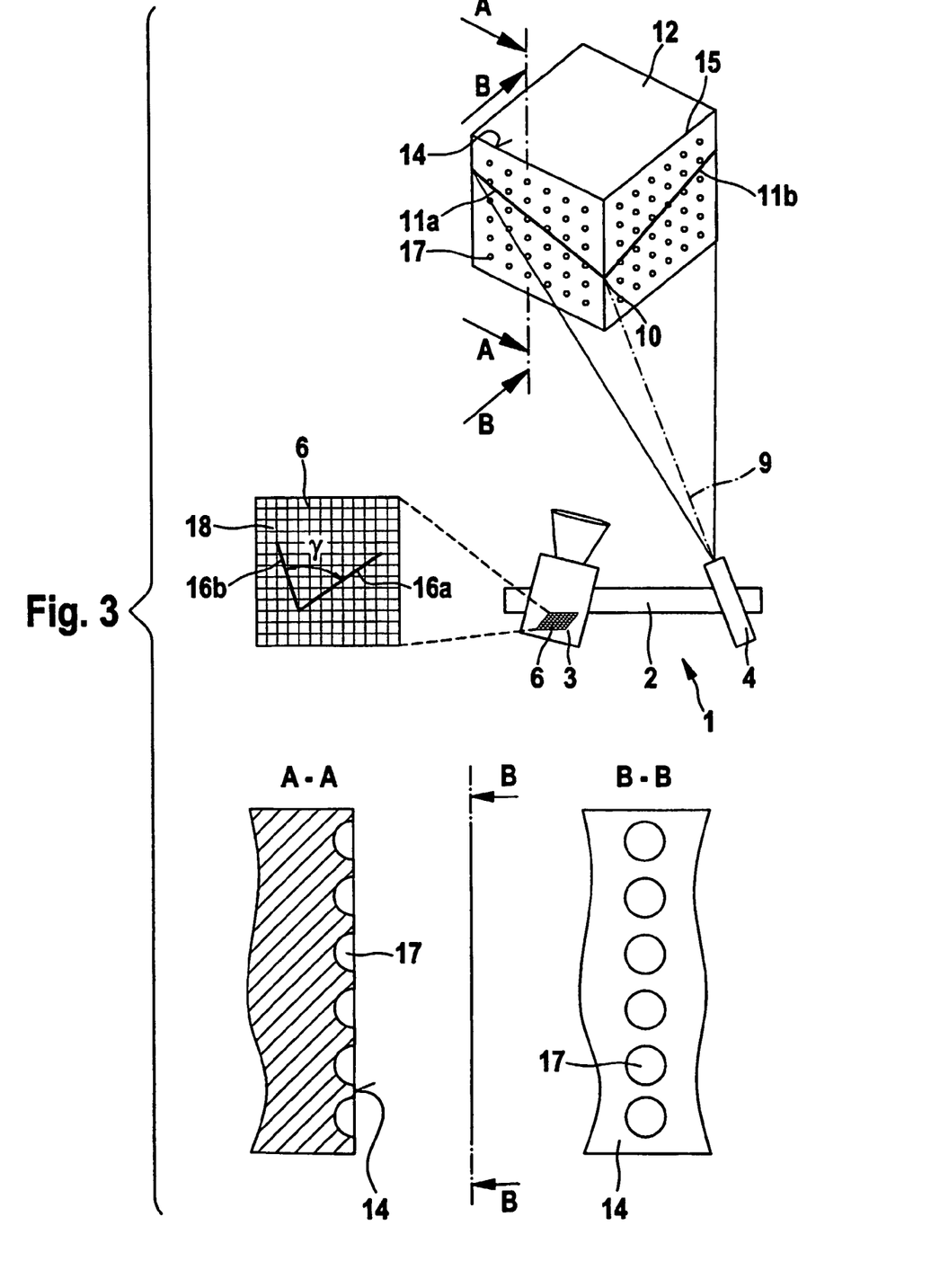
FIG. 3 shows a calibration setup for the camera-laser-unit in detail.

FIG. 3 shows the calibration-object 12 according to the present invention with its two planes 14, 15 facing the camera-laser-unit 1. Any object 12 comprising two calibration planes 14, 15 is suitable for the calibration process according to the invention. A non-coplanar calibration-pattern comprising an array of recesses 17 is disposed on the two planes 14, 15. Of course, the calibration-object 12 can comprise an array of any kind of features, such as simple prints on the planes 14, 15 of any desired shape and cross section, instead of the recesses 17.

In the embodiment shown in FIG. 3 the calibration-pattern comprises a six by six array of 36 grid-like disposed recesses 17 on each plane 14, 15. Each recess 17 of the calibration-pattern is designed as a cavity having a circular cross section viewed from above. The same calibration-object 12 is used for calibration of the camera 3 as well as for calibration of the laser 4. The two planes 14, 15 are disposed at a known angle $\beta$, preferably 90°. The closer to perpendicular the two planes 14, 15 are, the larger is the volume over which the calibration is valid, so larger angles $\beta$ could be used if volume is not a critical factor.

The present invention refers to a particularly advantageous process for calibrating the camera-laser-unit 1 with respect to the calibration-object 12 disposed at a given position and orientation within the three-dimensional space 13. The process comprises the following steps:

Selecting a calibration-object 12 comprising at least two planes 14, 15 disposed at a given angle $\beta$ with respect to each other and provided with a given non-coplanar calibration-pattern (see FIG. 3). Preferably, the angle $\beta$ is 90°.

Disposing the calibration-object 12 at a given position and orientation in three-dimensional space 13 with respect to the camera-laser-unit 1, wherein the orientation of the calibration-object 12 is such that light emitted by the laser 4 is visible for the camera 3 on at least two planes 14, 15 of the calibration-object 12.

In a first step, calibrating the camera 3 with respect to the calibration-object 12 using a Tsai algorithm. The Tsai algorithm is well known for camera calibration. It is described in detail in M. Tapper, Ph. J. McKerrow, J. Abrantes: "Problems Encountered in the Implementation of Tsai's Algorithm for Camera Calibration", Proc. 2002 Australasian Conference on Robotics and Automation, Auckland, 27-29 Nov. 2002, which is hereby incorporated by reference.

In a second step calibrating the laser 4 with respect to the (already calibrated) camera 3, and activating the laser 4 in order to make it emit light (line 11) visible as two lines 11a, 11b on the two planes 14, 15 of the calibration-object 12, recording the light (lines 11a, 11b) on the planes 14, 15 by the camera 3 and reproducing the image (lines 16a, 16b) on the CCD-chip 6 by the camera lens 7, determining the laser-properties from the light 16 recorded by the camera 3, and calibrating the laser 4 according to the determined laser-properties.

The laser-properties are determined from the properties (length and angle $\gamma$) of the lines 16a, 16b reproduced on the CCD-chip 6 of the already calibrated camera 3 by using a line detection algorithm. The two lines 11a, 11b can be easily reconstructed in space from the images 16a, 16b using the camera parameters and the known geometry of the calibration object 12. Once the two three dimensional lines 11a, 11b are determined, the information is adequate to reconstruct the laser plane(s)

According to the present invention, calibration of the camera-laser-unit 1 is performed in two steps:

First, standard camera calibration is performed to define the internal parameters of the camera 3 and the position of the camera 3 with reference to a coordinate system.

Second, the position of the laser plane (defined by the optical axis 9 and the line 11) is defined with reference to the same coordinate system.

These two sets of parameters—camera parameters and laser plane equations—provide all the information necessary for performing projection and reconstruction using the camera-laser-unit 1 (e.g. transformation from image pixels 18 of the CCD-chip 5 (see FIG. 3) into millimeters (mm) and vice versa.

Figure 4:
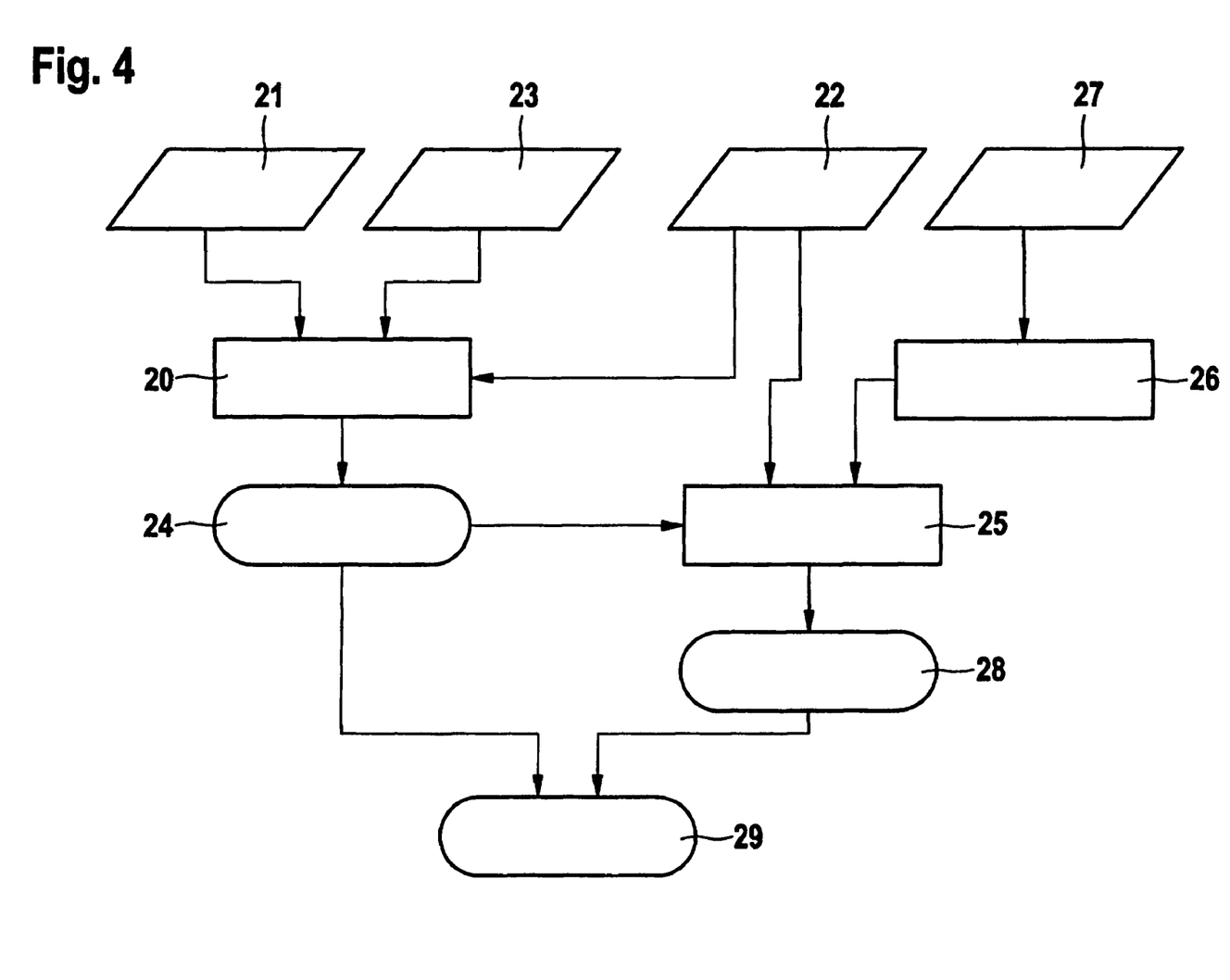
FIG. 4 shows a flow chart of a preferred embodiment of a method for calibrating a camera-laser-unit according to the present invention.

Making reference to the flow chart of FIG. 4, the method for calibrating the camera-laser-unit 1 according to the present invention will now be described in detail. The first step of the calibration process is to calibrate the camera 3 (step 20) using an image 21 and the geometry 22 of the calibration object 12 and nominal camera parameters 23. The calibration of the camera is done by using a non-coplanar Tsai calibration algorithm. As a result of the camera calibration the camera parameters 24 are obtained.

The second step of the calibration process is to determine the laser plane(s) (step 25) defined by the optical axis 9 and the line 11 of light emitted by the laser 4. This can be accomplished by detecting the points belonging to the laser lines 11a, 11b visible on the calibration-object 12. The laser line(s) 11a, 11b are extracted (step 26) from the laser line image 27 taken by the camera 3. The geometry 22 of the calibration object 12, the camera parameters 24 and the extracted laser lines 26 are used for determining the laser plane(s) 25. As a result of the determination of the laser planes(s) the laser plane(s) 28 are obtained. Output 29 is calculated from the camera parameters 24 and the laser plane(s) 28. The output is, for example, a transformation matrix.

Figure 5:
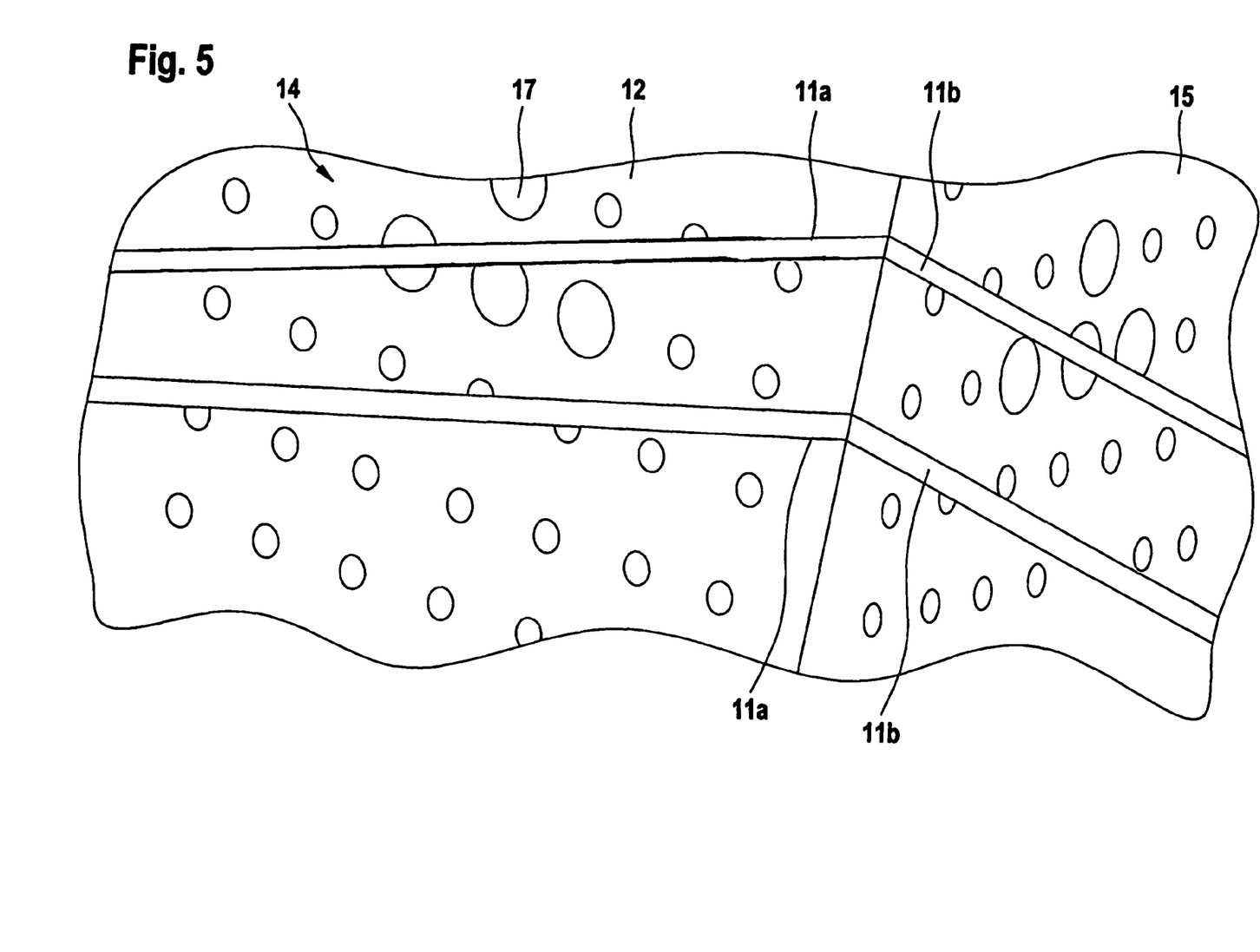
FIG. 5 shows an example for a calibration-image.

FIG. 5 shows an example for a calibration-image comprising two laser planes each with lines 11a and 11b on the respective planes 14 and 15 of the calibration object 12. Provided that the scene illumination is not too bright (to avoid saturation) and that the surface of the calibration object 12 is not too reflective, the laser lines 11a and 11b can be easily distinguished.

The detection of the laser lines 11a and 11b comprises the following steps:

Automatically defining or detecting the regions in the image recorded by the camera 3 covered by each plane 14, 15;

For each region:

scanning the region horizontally or vertically, depending on the relative positions of camera 3 and laser 4 and detecting the brightest pixel along each line or column. For multiple laser planes (see FIG. 5), multiple points can be detected, provided that some estimation for the minimum and maximum distance between the lines is known (in pixels). This estimation can either be defined by the user, or calculated automatically from the angle between two adjacent laser planes and the calibration planes' 14, 15 positions.

For each detected pixel, detecting the center of intensity on its neighborhood, using the weighted average of pixel intensities.

For each laser plane, fitting a line on the detected points, using a linear regression algorithm.

Calculating the distance of each detected point from all detected lines 11a, 11b. If the point is closer to some other line 11a, 11b, then this point is misclassified, so it has to be moved to the correct set of points.

One approach to define a laser plane once a pair of laser lines 11a, 11b has been extracted (step 26), is to reconstruct the lines in three dimensional space, using the camera calibration parameters 24 and the plane equations of the calibration planes 14, 15. The two reconstructed lines have adequate information to determine the plane of the laser 4 in the same coordinate system. A second approach that has proved to be more accurate, is to reconstruct all detected points (using the camera parameters 24 and the equations of the calibration planes 14, 15), and iteratively fitting a plane to the reconstructed set of points, discarding at each step the most distant points. The position and orientation of the two planes 14, 15 can be easily defined with respect to a common coordinate system, e.g. centered at the point of intersection 10 of the two lines 11a, 11b.

As described above, calibration of a camera-laser-unit 1 with any number of laser planes can be performed using a three dimensional calibration-object 12, comprising at least two calibration planes 14, 15. Of course, the complexity of the procedure would increase if objects 12 with more than two planes were considered. The main advantages of the method according to the present invention are:

The same camera model that is used for the calibration of the camera 3 can be used for the calibration of the laser 4 allowing a straight forward integration of the laser calibration into existing camera calibration processes.

Calibration of the camera 3 is performed by using an already existing, well known and highly tested Tsai-based algorithm and appropriate software.

The topology of the calibration-object 12 is easy to construct with very high accuracy.

High accuracy of calibration can be guaranteed over an entire volume covered by the calibration object 12.

The camera-laser-unit 1 can be easily and directly calibrated in any coordinate frame 19 (if the position of point of origin 0 of the frame 19 is known in the global coordinate frame 13), without the need for time-consuming alignment processing.

We claim:

1. A method for calibrating a camera-laser-unit with respect to at least one calibration-object disposed at a given position and orientation in three-dimensional space, the camera-laser-unit having at least one laser and at least one camera, wherein the laser and the camera are disposed at a given distance with respect to one another, and an optical axis of the laser and an optical axis of the camera subtend a given angle ($\alpha$), the camera-laser-unit being adapted to record a location, shape and/or dimensions of a measurement-object, the method comprising the steps of:

a) selecting a calibration-object having at least two planes disposed at a given angle ($\beta$) with respect to each other, each plane having a given, non-coplanar calibration-pattern;

b) disposing the calibration-object at a given position and orientation in three-dimensional space with respect to the camera-laser-unit, wherein an orientation of the calibration-object is such that light emitted by the laser is visible to the camera on the at least two planes of the calibration-object;

c) determining a location of the camera with respect to the calibration-object using a Tsai algorithm;

d) calibrating the camera in three-dimensional space using the results of steps b) and c);

e) activating the laser to emit light visible on the at least two planes of the calibration-object;

f) the light on the two planes with the camera;

g) determining the laser-properties from the light recorded by the camera;

h) determining a location of the laser relative to the camera; and i) calibrating the laser in three-dimensional space using the results of steps d) and h).

2. The method of claim 1, wherein step g) comprises the step of defining a relative position and orientation of the laser with respect to a coordinate frame associated with the calibration-object, wherein the coordinate frame has a given position and orientation in three-dimensional space.

3. The method of claim 1, wherein light emitted by the laser is visible on the two planes of the calibration-object as a line on each plane, the lines intersecting at a contact line of the two planes, wherein the laser-properties are determined from the lines recorded by the camera using a line detection algorithm.

4. The method of claim 1, wherein light emitted by the laser is visible on the two planes of the calibration-object as a line on each plane, the lines intersecting at a contact line of the two planes, wherein a laser-plane is defined by an optical axis of the laser and the lines visible on the two planes of the calibration-object object, wherein, a position and orientation of the laser-plane with respect to a coordinate frame associated with the calibration-object is defined to calibrate the laser according to determined laser-properties.

5. The method of claim 1, wherein step c) comprises the step of defining a relative position and orientation of the camera with respect to a coordinate frame associated with the calibration-object, said coordinate frame having a given position and orientation in three-dimensional space.

6. The method of claim 1, further comprising defining a transformation matrix in dependence on a relative position and orientation of the camera with respect to a coordinate frame associated with the calibration-object, a relative position and orientation of the laser with respect to the coordinate frame, and/or on internal camera parameters.

7. The method of claim 1, further comprising grasping the camera-laser-unit with an industrial robot and disposing the unit relative to the calibration-object in a given position and orientation in three-dimensional space, wherein an orientation of the camera-laser-unit is such that light emitted by the laser is visible to the camera on the at least two planes of the calibration-object.

8. A device for calibrating a camera-laser-unit with respect to at least one calibration-object disposed at a given position and orientation in three-dimensional space, the camera-laser-unit having at least one laser and at least one camera, wherein the laser and the camera are disposed at a given distance with respect to one another, and an optical axis of the laser and an optical axis of the camera subtend a given angle ($\alpha$), the camera-laser-unit being adapted to record a location, shape and/or dimensions of a measurement-object, the device comprising:

means for selecting a calibration-object having at least two planes disposed at a given angle ($\beta$) with respect to each other, each plane having a given, non-coplanar calibration-pattern;

means for disposing the calibration-object at a given position and orientation in three-dimensional space with respect to the camera-laser-unit, wherein an orientation of the calibration-object is such that light emitted by the laser is visible to the camera on the at least two planes of the calibration-object;

means for determining a location of the camera with respect to the calibration-object using a Tsai algorithm;

means for calibrating the camera in three-dimensional space using results generated by the means for disposing the calibration object and by the means for determining a location of the camera with respect to the calibration-object;

means for activating the laser to emit light visible on the at least two planes of the calibration-object;

means for recording the light on the two planes with the camera;

means for determining the laser-properties from the light recorded by the camera:

means for determining a location of the laser relative to the camera;and means for calibrating the laser in three-dimensional space using results generated by the means for calibrating the camera in three-dimensional space and the means for determining the location of the laser relative to the camera.

9. The device of claim 8, wherein said non-coplanar calibration-pattern has an array of features, said calibration-object being structured and dimensioned for calibration of the camera as well as for calibration of the laser.

10. The device of claim 9, wherein said angle between said two planes of the calibration-object is a right angle.

11. The device of claim 9, wherein features of said calibration-pattern are designed as recesses or as cavities having a circular cross section.

12. The device of claim 9, wherein features of said calibration-pattern comprise prints on said two planes.

* * * * *